United States Patent
Burst et al.

(10) Patent No.: US 8,092,655 B2
(45) Date of Patent: Jan. 10, 2012

(54) DIVIDING WALL COLUMN FOR FRACTIONATION OF A MULTICOMPONENT MIXTURE

(75) Inventors: Wolfram Burst, Mannheim (DE); Horst Hartmann, Böhl-Iggelheim (DE); Gerd Kaibel, Lampertheim (DE); Guido Harms, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 776 days.

(21) Appl. No.: 09/782,305

(22) Filed: Feb. 14, 2001

(65) Prior Publication Data

US 2011/0139604 A1 Jun. 16, 2011

(30) Foreign Application Priority Data

Feb. 24, 2000 (DE) .................................. 100 08 634

(51) Int. Cl.
*B01D 1/14* (2006.01)
*B01D 3/42* (2006.01)
*C07C 67/54* (2006.01)

(52) U.S. Cl. .......... 203/1; 159/43.1; 159/47.1; 159/906; 202/158; 196/111; 203/99; 203/DIG. 19; 560/191

(58) Field of Classification Search ................... 202/158, 202/160; 203/1, 2, 99, DIG. 19; 196/111; 159/43.1, 44, 47.1, 906; 560/45, 126, 191; 261/DIG. 72

See application file for complete search history.

(56) References Cited

U.S. PATENT DOCUMENTS 5,669,236 A * 9/1997 Billingham et al. ............ 62/643
7,090,748 B2 * 8/2006 Kaibel et al. ................. 202/158
7,329,330 B2 * 2/2008 Gall et al. .......................... 203/1
7,528,290 B2 * 5/2009 Zimmermann et al. ...... 585/809
2002/0183566 A1 * 12/2002 Guth et al. .................... 568/902
2010/0113805 A1 * 5/2010 Windecker et al. ........... 549/262

FOREIGN PATENT DOCUMENTS

| CA | 1 222 717 | 6/1987 |
|---|---|---|
| CA | 1 242 309 | 9/1988 |
| EP | 0 122 367 | 10/1984 |
| EP | 122 367 | 10/1984 |
| EP | 133 510 | 2/1985 |
| EP | 0 832 604 | 2/1998 |
| EP | 1084741 | * 3/2001 |

* cited by examiner

*Primary Examiner* — Virginia Manoharan
(74) *Attorney, Agent, or Firm* — Novak Druce + Quigg LLP

(57) ABSTRACT

A dividing wall column is described which includes the following segments:
a) an upper column region (1),
b) an enrichment section (2) of the feed section,
c) a stripping section (4) of the feed section,
d) an upper part (3) of the offtake section,
e) a lower part (5) of the offtake section,
f) an intermediate region (9) of the feed section,
g) an intermediate region (10) of the offtake section and
h) a lower column region (6).

Figure 1:
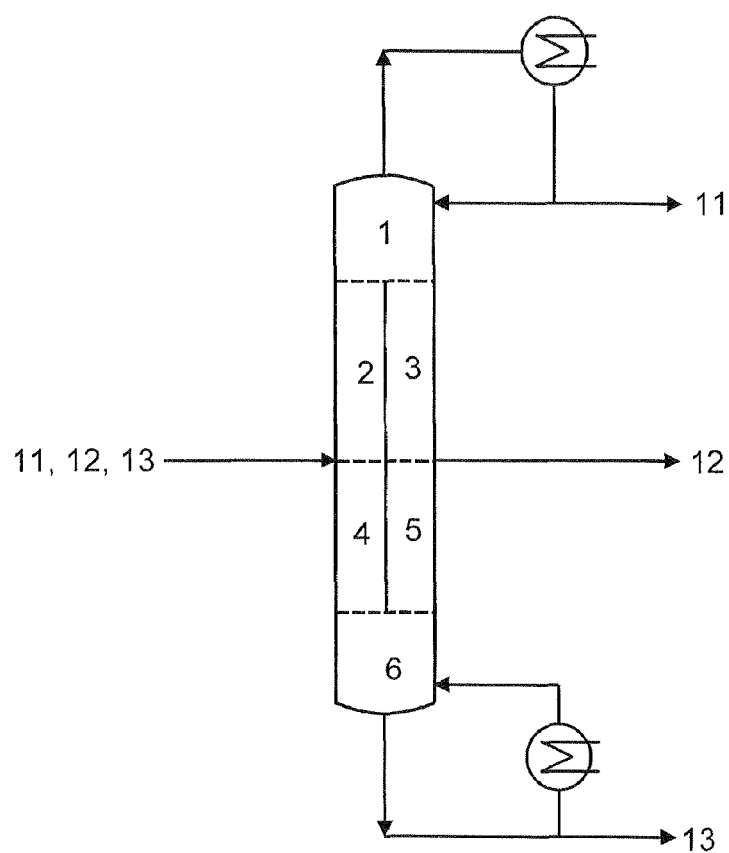

The dividing wall column has a dividing wall (7) is located vertically between the segments b) (2) and d) (3) and between the segments c) (4) and e) (5). The segments b) (2), d) (3), c) (4) and e) (5) have separation-active internals, Segment b (2) has a cross-sectional area $A_b$ which is at least 10% smaller than the cross-sectional area $A_d$ of segment d) (3), and segment c) has a cross-sectional area $A_c$ which is at least 10% greater than the cross-sectional area $A_e$ of segment e) (5).

14 Claims, 4 Drawing Sheets

DIVIDING WALL COLUMN FOR FRACTIONATION OF A MULTICOMPONENT MIXTURE

The present invention relates to a dividing wall column for the fractionation of a multicomponent mixture and a process for isolating pure ethylhexyl p-methoxycinnamate by distillation.

In the fractionation of feed mixtures into more than two highly pure fractions, for example into low boilers, intermediate boilers and high boilers, it is normally necessary to use a plurality of distillation columns. To limit the outlay in terms of apparatus, the fractionation of multicomponent mixtures consisting of more than two components is carried out using columns which are suitable for taking off liquid and gaseous media at side offtakes. However, the utility of distillation columns having side offtakes is greatly restricted by the fact that products taken off at the side offtakes are normally not completely pure. In the case of products taken off at the side in the enrichment section of a distillation apparatus, which are usually taken off in liquid form, the side products still contain proportions of low-boiling components which are normally taken off at the top. An analogous situation applies to products taken off at the side in the stripping section, which are usually taken off in vapor form and still contain proportions of the high boiler. When using such conventional side offtake columns, contaminated side products are virtually always obtained, so that the use of side offtake columns is unsuitable for the isolation of pure substances.

For this reason, it is generally necessary to use column assemblies comprising at least two separate columns, especially for the isolation of intermediate-boiling pure substances from multicomponent mixtures.

An advantageous alternative is provided by dividing wall columns. The use of dividing wall columns likewise makes it possible to isolate side products, i.e. intermediate-boiling components, in pure form from multicomponent mixtures. In dividing wall columns, a dividing wall is installed in the middle region. This extends above and below the feed point. On the other side, which is located opposite the feed point, there is provided at least one side offtake located at the same height as or above or below the feed point. The dividing wall is located between side offtake and feed point. The dividing wall is arranged vertically. In the region of the column which is divided by the dividing wall, transverse mixing of liquid and vapor streams is not possible. This reduces the total number of distillation columns required in the fractionation of multicomponent mixtures. A dividing wall column generally has the following segments:

an upper column region located above the dividing wall,
a feed section located on the side of the feed point and bounded laterally by the dividing wall,
an offtake section located on the side of the side offtake and is bounded laterally by the dividing wall and
a lower column region located below the dividing wall.

The enrichment section of the feed section is the upper region of the feed section located above the feed point, and the stripping section of the feed section is the lower part of the feed section located below the feed point. The offtake section is divided into an upper part located above the side offtake and a lower part located below the side offtake. A dividing wall column is in principle a constructional simplification of thermally coupled distillation columns, but the latter incur higher capital costs. Dividing wall columns and thermally coupled columns offer advantages over an assembly of conventional distillation columns both in respect of energy consumption and in terms of capital costs and their use is therefore preferred in industry. Dividing wall columns can be configured either as packed columns containing random or ordered packing or as tray columns. If packed columns containing ordered packing are used, ordered mesh packing having a specific surface area of from 300 to 800 $m^2/m^3$, preferably from 500 to 750 $m^2/m^3$, is particularly suitable. Dividing wall columns are usually configured so that the dividing wall runs vertically and the cross-sectional areas of the offtake section and of the feed section are equal. Further information on dividing wall columns is given, for example, in EP-A-0 122 367, EP-B-0 126 288 and EP-B-0 133 510.

It is an object of the present invention to provide a dividing wall column which has lower operating costs and gives better separation performance than previously known dividing wall columns, particularly at low operating pressures of from about 0.5 to 20 mbar. Particular attention should be paid to the segments of this dividing wall column being optimally utilized in the distillation process.

We have found that this object is achieved by a dividing wall column divided in the middle region into a feed section and an offtake section by a dividing wall and having as segments a) an upper column region,
b) an enrichment section of the feed section,
c) a stripping section of the feed section,
d) an upper part of the offtake section,
e) a lower part of the offtake section,
f) an intermediate region of the feed section,
g) an intermediate region of the offtake section and
h) a lower column region, where the dividing wall is located vertically between the segments b) and d) and between the segments c) and e), the segments b), d), c) and e) have separation-active internals and the cross-sectional area $A_b$ of the segment b) is at least 10% smaller than the cross-sectional area $A_d$ of segment d), and the cross-sectional area $A_c$ of the segment c) is at least 10% greater than the cross-sectional area $A_e$ of segment e).

Segment f) is located between the segments b) and c) and, correspondingly, segment g) is located between the segments d) and e). The segments b) and d) usually have the same number and same types of separation-active internals. In general, the segments c) and e) have the same number and same types of separation-active internals. The upper column region and the lower column region preferably contain separation-active internals, but the intermediate region usually has no separation-active internals.

The advantage of the dividing wall column of the present invention is that, particularly at low operating pressures of from about 0.5 to 20 mbar, the separation can be carried out at lower cost and with a better separation performance than when using a dividing wall column of the prior art. These advantageous results are achieved, in particular, in applications in which, as a result of the multicomponent mixture fed in, the load in the segments b) and e) is comparatively low and the load in the segments c) and d) is comparatively high. Thus, the dimensions of the segments are designed according to the F factor. The F factor is a measure of the load due to the gas stream in the column, namely a measure of the impulse of this gas (F factor: gas velocity in m/s multiplied by the root of the gas density in $kg/m^3$). At a higher F factor, a greater cross-sectional area is accordingly provided in the segment concerned. This leads to optimal loading of this segment and thus to better separation performance. Conversely, segments which have a lower loading are made smaller so that sufficient wetting of the separation-active internals present by a liquid film is ensured; if the latter segments were to have larger dimensions, corresponding separation-active internals would normally not be completely wetted. Complete wetting of the separation-active internals is, however, a prerequisite for a high separation performance. The dividing wall column of the present invention can thus be matched optimally to the respective separation task —no segments having unnecessarily large dimensions for the separation problem concerned are installed, as a result of which the outlay in terms of apparatus is reduced and the corresponding separation process can be made more cost effective.

The segments may, if desired, also be provided with various separation-active internals and distribution devices for liquid. For applications in the subatmospheric pressure range, it is possible to provide specific distributors whose design and dimensions are chosen in conjunction with the determination of the ratios of the cross sections of the segments. The corresponding ratios of the cross sections are usually chosen so that favorable conditions for liquid distribution are obtained, particularly at low operating pressures of from about 0.5 to about 20 mbar at low liquid downflow densities. The separation internals in the segments are generally selected so that they incur minimal capital costs. The preferred ratio of the cross-sectional areas depends on the division ratio of the liquid at the upper end of the dividing wall and on the operating pressure P. For the purposes of the present invention, the operating pressure is the pressure at the top of the dividing wall column. In general, the cross-sectional area $A_b$ of the segment b) is at least 40%, preferably at least 60%, smaller than the cross-sectional area $A_d$ of segment d). Furthermore, the cross-sectional area $A_c$ of the segment c) is usually at least 40%, preferably at least 60%, greater than the cross-sectional area $A_e$ of segment e).

In a preferred embodiment of the invention, the operating pressure P is in the range from 0.0005 to 10 bar and the calculated ratios of the cross-sectional areas $A'_b/A'_d$ and $A'_c/A'_e$ are given by the following relationships:

$$\frac{A'_b}{A'_d} = \left(\frac{m_{s,b}}{m_{s,d}}\right) \times \left(\frac{m_{i,b}}{m_{i,d}}\right)^c$$

$$\frac{A'_c}{A'_e} = \left(\frac{m_{s,c}}{m_{s,e}}\right) \times \left(\frac{m_{i,c}}{m_{i,e}}\right)^c$$

Here, $A'_b$, $A'_d$, $A'_c$, $A'_e$ are the cross-sectional areas of the segments b,d,c,e provided for the calculation; $m_{s,b}$, $m_{s,d}$, $m_{s,c}$, $m_{s,e}$ are the volume flows of gas through the segments b,d,c,e, measured in m³/h; $m_{i,b}$, $m_{i,d}$, $m_{i,c}$, $m_{i,e}$ are the volume flows of liquid through the segments b,d,c,e, measured in m³/h, and the exponent C is obtained as operating-pressure-dependent variable from the empirically determined function shown in FIG. 3. The calculated ratios $A'_b/A'_d$ and $A'_c/A'_e$ deviate from the corresponding, actual ratios $A_b/A_d$ and $A_c/A_e$ by not more than 30%, preferably not more than 20%. In the dividing wall column, correspondingly desired area ratios can also be realized for ordered packing, since the manufacture of the ordered packing elements is now usually computer controlled in the manufacturing companies.

In the design of the dividing wall column, the separation stages should preferably be divided so that the height of the segment b) together with that of the segment e) is as close as possible to the height of the segment c) together with that of the segment d). If unequal heights of the separation internals cannot be circumvented, subregions in the segments b) and e) or in the segments c) and d) are not provided with separation internals. However, appropriate choice of separation internals of different separation performance usually allows such free spaces to be avoided in practice.

The operating pressure of the dividing wall column is frequently in the range from 0.0005 to 0.02 bar and use is made of liquid distributors in which the liquid distribution occurs by the bank-up principle and the downstream fine liquid distribution occurs by the capillary principle. The number of drip points is preferably from about 200/m² to 1 000/m². Preferred construction types are channel groove distributors. Also suitable are channel groove distributors in which the capillary liquid distribution is circular and also ones in which the capillary liquid distribution is linear. However, all these different construction types can distribute small amounts of liquid in a high degree of dispersion over large cross-sectional areas. Together with the optimized ratios of the cross sections of the segments, advantageous constructions are thus obtained for columns which operate at low pressures of from 0.5 to 10 mbar.

Ordered packing elements having a cross-channel structure are frequently used as separation-active internals. Here, the uppermost packing element below the liquid distributor is usually aligned so that the individual layers run parallel to the dividing wall.

In the construction of the dividing wall column, the dividing wall is preferably fixed to the column wall by welding. However, it is also possible in principle to provide releasable connections or to mount the dividing wall unfastened between the packing elements, as described in EP-A-0 804 951. The part of the dividing wall which is located between the segments f) and g) is generally fixed in place by welding. The dividing wall between the segments f) and g) is generally arranged obliquely and usually forms an angle of from 25 to 75°, preferably from 55 to 65°, to the horizontal. In this arrangement, turbulence in the gas stream, which can adversely affect the separation performance, is largely avoided.

In general, the liquid is conveyed to the feed section by means of a pump or is introduced in a flow-controlled manner via a static feed height of at least about 1 m. The flow control is usually set so that the amount of liquid introduced into the feed section cannot drop below 30% of the "normal value" (for the present purposes, the normal value is the amount, averaged over time, obtained per unit time at a particular point in the corresponding continuous process). The division of the liquid flowing down from the segment d) in the offtake section to the side offtake and to the segment e) in the offtake section is generally set by means of a flow control so that the amount of liquid flowing into the segment e) cannot drop below 30% of the "normal value".

The liquid can be taken off and divided at the upper end of the dividing wall and at the side offtake by means of either internal collection spaces for the liquid or such spaces located outside the column. These collection spaces assume the function of a pump reservoir. In the case of tray columns, it is particularly useful for this purpose to increase the downflow shaft to about 2 to 3 times the customary height and to store the appropriate amount of liquid in the downflow shaft. When using packed columns, the liquid is firstly collected in collectors and from there conveyed into an internal or external collection space. In general, pivoting funnels offer an inexpensive alternative. In the case of tray columns and if pressures are relatively high, the liquid can also advantageously be banked up in a chimney tray.

In a preferred embodiment of the invention, the feed mixture introduced contains from 70 to 95%, preferably from 75 to 90%, of ethylhexyl p-methoxycinnamate as intermediate-boiling desired product.

In addition to ethylhexyl p-methoxycinnamate, this mixture usually further comprises from 1 to 5% of lower-boiling by-products and from 5 to 25% of higher-boiling by-products. The number of theoretical plates in the dividing wall column used is then usually about 35 and the ratios of the cross-sectional areas $A_b/A_d$ are generally from 1:1.6 to 1:2.4, preferably from 1:1.8 to 1:2.2, and the ratios $A_c/A_e$ are from 1:1.6 to 1:2.4, preferably from 1:1.8 to 1:2.2. Correspondingly, the dividing wall column is then operated at a pressure at the top of from 1 to 10 mbar, preferably from 4 to 6 mbar.

The present invention also provides a process for isolating pure ethylhexyl p-methoxycinnamate by distillation using a dividing wall column as described above. In the process of the present invention, the feed mixture (11, 12, 13) introduced comprises from 70 to 95%, preferably from 75 to 90%, of ethylhexyl p-methoxycinnamate as intermediate-boiling desired product (12).

Figure 2:
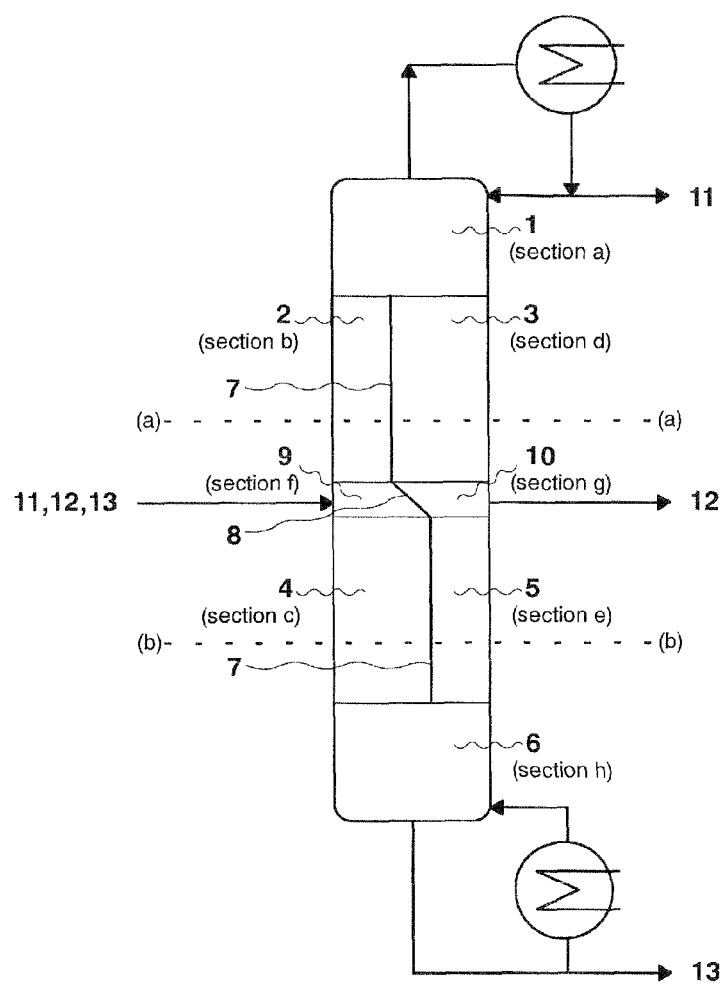
Figure 2A:
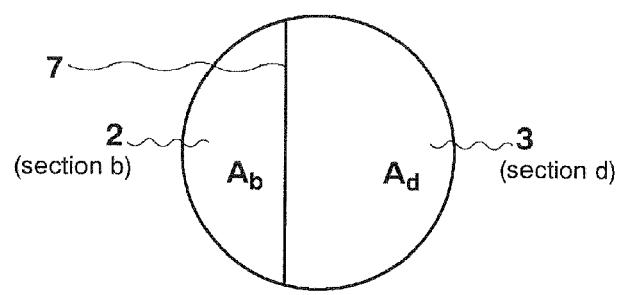
Figure 2B:
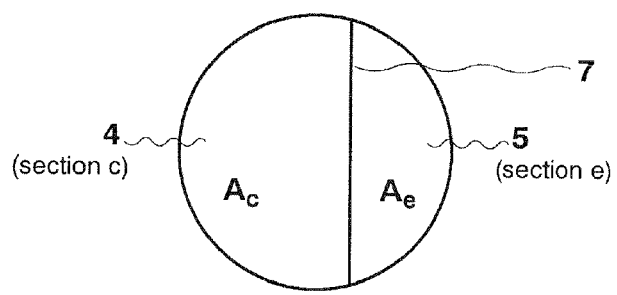
Figure 3:
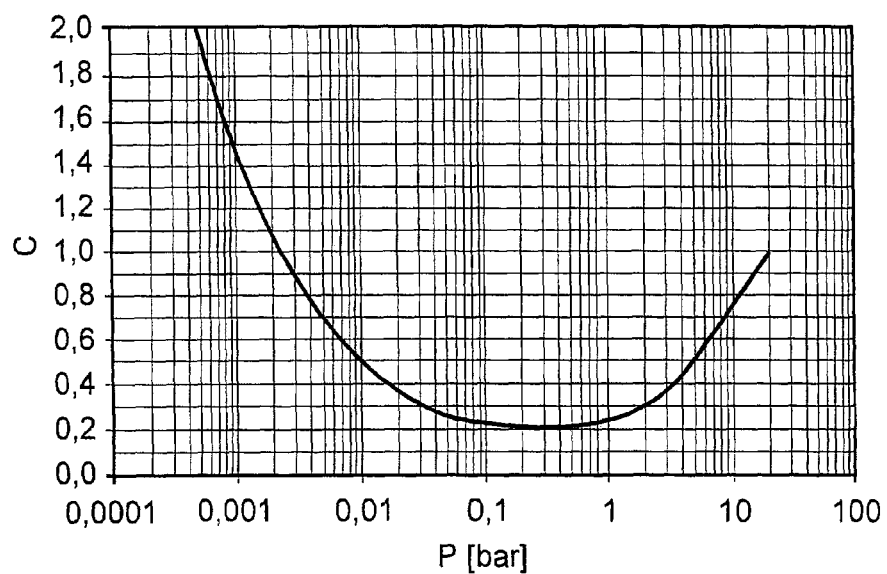

In the accompanying drawing,

FIG. 1 schematically shows a dividing wall column according to the prior art, FIG. 2 schematically shows a dividing wall column according to the present invention, FIGS. 2a and 2b schematically show the cross-sections of the dividing wall column according to the present invention indicated in FIG. 2 by (a)- - -(a) and (b)- - -(b), respectively, and FIG. 3 shows the dependence of the empirically determined exponent C on the operating pressure of the dividing wall column.

FIG. 2 shows the fractionation of a multicomponent feed mixture 11, 12, 13 in a dividing wall column according to the present invention to give a low boiler 11, an intermediate-boiling desired product 12 and a high boiler 13. The dividing wall 7, 8 is vertical in its upper and lower sections 7 and is arranged obliquely in its middle section 8. The upper column region 1 is located above the dividing wall 7, 8, and the lower column region 6 is located below the dividing wall 7, 8. The feed line opens into segment f) 9 and the side offtake is connected to the segment g) 10.

The invention is illustrated below by means of an example.

EXAMPLE

The dividing wall column used as experimental column had a diameter of 0.2 meters, was provided over a total height of 7 meters with wire mesh packing having a specific surface area of 500 $m^2/m^3$ and contained a total of 41 theoretical plates. The dividing wall was welded in place between the 8th and 30th stages (counted from the bottom). The feed point and the offtake point for the liquid taken off at the side were located at the same height. The liquid was divided in a flow ratio of 1:3 between the segments b) 2 and d) 3 of the column. The ratio of areas of the segments b) 2 and d) 3 of the column was 1:2, and the ratio of the areas of the segments c) 4 and e) 5 of the column was 2:1. The middle region 8 of the dividing wall 7, 8 was arranged obliquely and had an angle of 60° to the horizontal. The pressure at the top was 5 mbar. The feed mixture 11, 12, 13 was introduced into the column in liquid form at a flow rate of 8.5 kg/h and a temperature of about 170° C. The feed mixture comprised 85% of ethylhexyl p-methoxycinnamate, 5% of lower-boiling by-products and 10% of higher-boiling by-products. At the top of the column, about 0.5 kg/h of lower-boiling by-products having a residual ethylhexyl p-methoxycinnamate content of 5% was taken off at a reflux ratio of 12. The bottom product, which comprised predominantly higher-boiling by-products, was taken off in an amount of about 0.9 kg/h and contained 5% of ethylhexyl p-methoxycinnamate. The intermediate-boiling desired product 12, namely ethylhexyl p-methoxycinnamate, was taken off as a liquid in an amount of about 7.1 kg/h and a purity of >99.5% at the side offtake.

The above experiment shows that certain multicomponent mixtures can be fractionated effectively: the intermediate-boiling desired product can be isolated in high purity. The above-described dividing wall column of the present invention enables, at a constant flow of the feed mixture introduced, the intermediate-boiling desired product to be obtained in a higher purity than when using a customary dividing wall column according to the prior art. This is due, inter alia, to the comparatively low pressure drop in the dividing wall column of the present invention. The lower pressure drop makes it possible for the dividing wall column to be operated at relatively low temperatures at the bottom. Low temperatures at the bottom result not only in energy savings but also in reduced formation of by-products which could get into the product taken off at the side. A dividing wall column according to the prior art would have to be correspondingly larger and require a higher energy input to achieve the same separation performance.

We claim:

1. A dividing wall column having a middle region which is divided into a feed section and an offtake section by a dividing wall and having the following segments a) to h):
   a) an upper column region,
   b) an enrichment section of the feed section which enrichment section has a cross-sectional area $A_b$,
   c) a stripping section of the feed section which stripping section has a cross-sectional area $A_c$,
   d) an upper part of the offtake section which upper part has a cross-sectional area $A_d$,
   e) a lower part of the offtake section which lower part has a cross-sectional area $A_e$,
   f) an intermediate region of the feed section,
   g) an intermediate region of the offtake section and
   h) a lower column region,
   wherein
   the dividing wall is located vertically between the segments b) and d) and between the segments c) and e),
   the segments b), d), c) and e) have separation-active internals,
   the cross-sectional area $A_b$ of the segment b) is at least 10% smaller than the cross-sectional area $A_d$ of segment d), and
   the cross-sectional area $A_b$ of the segment c) is at least 10% greater than the cross-sectional area $A_e$ of segment e).

2. The dividing wall column of claim 1, wherein the cross-sectional area $A_b$ of the segment b) is at least smaller than the cross-sectional area $A_d$ of segment d).

3. The dividing wall column of claim 1, wherein the cross-sectional area $A_c$ of the segment c) is at least 40% greater than the cross-sectional area $A_e$ of segment e).

4. The dividing wall column of claim 1, wherein the dividing wall is arranged obliquely between the segments f) and g) and forms an angle of from 25 to 75° to the horizontal.

5. The dividing wall column of claim 1, having an operating pressure P in the range from 0.0005 to 10 bar, and having ratios of the cross-sectional areas $A'_b/A'_d$ and $A'_c/A'_e$ calculated by the following relationships $$\frac{A'_b}{A'_d} = \left(\frac{m_{s,b}}{m_{s,d}}\right) \times \left(\frac{m_{i,b}}{m_{i,d}}\right)^c$$

-continued $$\frac{A'_c}{A'_e} = \left(\frac{m_{s,c}}{m_{s,e}}\right) \times \left(\frac{m_{i,c}}{m_{i,e}}\right)^c$$

wherein $A'_b, A'_d, A'_c/A_e$ are the cross-sectional areas of the segments b, d, c, e provided for the calculation;

$m_{s,b}, m_{s,d}, m_{s,c}, m_{s,e}$ are the volume flows of gas through the segments b, d, c, e, measured in $m^3/h$;

$m_{i,b}, m_{i,d}, m_{i,c}, m_{i,e}$ are the volume flows of liquid through the segments b, d, c, e, measured in $m^3/h$, and the exponent C is an operating-pressure-dependent variable, and the calculated ratios $A'_b/A'_d$ and $A'_c/A_e$ deviate from the corresponding, actual ratios $A_b/A_d$ and $A_c/A_e$ by not more than 30%.

6. The dividing wall column of claim 5, wherein the calculated ratios $A'_b/A'_d$ and $A'_c/A'_e$ deviate from the corresponding, actual ratios $A_b/A_d$ and $A_c/A_e$ by not more than 20%.

7. The dividing wall column of claim 1, having an operating pressure of from 0.0005 to 0.02 bar, and having liquid distributors which provide a liquid predistribution based on a bank-up principle and a downstream liquid fine distribution based on a capillary principle.

8. The dividing wall column of claim 7, wherein the separation-active internals are an ordered packing having a cross-channel structure, and the packing has an uppermost packing layer below the liquid distributor which is aligned so that individual layers of the ordered packing are aligned parallel to the dividing wall.

9. A The dividing wall column as claimed in of claim 1, wherein the separation-active internals are an ordered packing having a cross-channel structure is used as separation active internals.

10. The dividing wall column of claim 1, wherein the cross-sectional area $A_b$ of the segment b) is at least 60% smaller than the cross-sectional area $A_d$ of segment d).

11. The dividing wall column of claim 1, wherein the cross-sectional area $A_c$ of the segment c) is at least 60% greater than the cross-sectional area of segment e).

12. The dividing wall column of claim 1, wherein the dividing wall is arranged obliquely between the segments f) and g) and forms an angle of from 55 to 65° to the horizontal.

13. A process for purifying ethylhexyl p-methoxycinnamate which comprises distilling a feed mixture comprising from 70 to 95% of ethylhexyl p-methoxycinnamate as an intermediate-boiling fraction in the dividing wall column of claim 1.

14. The process of claim 13, wherein the feed mixture comprises from 75 to 90% of ethylhexyl p-methoxycinnamate.

* * * * *

UNITED STATES PATENT AND TRADEMARK OFFICE
CERTIFICATE OF CORRECTION

PATENT NO. : 8,092,655 B2  
APPLICATION NO. : 09/782305  
DATED : January 10, 2012  
INVENTOR(S) : Burst et al.

Page 1 of 1

It is certified that error appears in the above-identified patent and that said Letters Patent is hereby corrected as shown below:

In Claim 2, at col. 6, indicated line 51:
The phrase "is at least smaller than" should read »is at least 40% smaller than«

In Claim 5, at col. 7, indicated line 6:
The phrase "A'.sub.c / A.sub.e" should read »A'.sub.c , A'.sub.e«

In Claim 9, at col. 8, indicated lines 7-8:
The phrase "cross-channel structure is used as separation active internals" should read »cross-channel structure«

Signed and Sealed this  
Fifth Day of February, 2013

Teresa Stanek Rea  
*Acting Director of the United States Patent and Trademark Office*